UNITED STATES PATENT OFFICE.

ANSON C. TICHENOR, OF SAN FRANCISCO, CALIFORNIA, ASSIGNOR OF ONE-HALF OF HIS RIGHT TO DAVID W. BOULDIN, OF SEDALIA, MISSOURI.

PROCESS OF OBTAINING GOLD FROM ITS ORES.

SPECIFICATION forming part of Letters Patent No. 228,140, dated May 25, 1880.

Application filed November 3, 1879.

*To all whom it may concern:*

Be it known that I, ANSON C. TICHENOR, of the city and county of San Francisco, and State of California, have invented a Process of Treating Gold Ores, of which the following is a specification.

The object of my invention is to put auriferous ores in such a condition that the metal can be recovered therefrom without material loss by vaporization, and I have discovered that a chloride of gold presents a most efficient reagent whereby my invention may be carried into effect.

The amount of chloride of gold used will vary in direct proportion to the rebellious character of the ore, varying from eight (8) ounces per ton to one hundred and sixty (160) ounces per ton.

When I desire to treat the ore with the dry chloride I take the pulverized ore as it comes from the stamp and thoroughly mix with it the necessary amount of chloride of gold, after which the ore may be subjected to any known process for the extraction of the metal.

To treat the ore with the wet chloride of gold I add to the pulverized ore the requisite amount of chloride in such a solution as to dampen the entire mass. The ore is then thoroughly agitated, and after agitation is washed until the color of the water shows no chloride solution remaining. The gold-bearing solution is then treated by precipitation, the free gold remaining in the ore.

The ore dampened by the chloride solution, as above described, may be mixed with lead-bearing ores, or metallic lead, and smelted direct to base bullion, to be then reduced by cupellation.

A chloride of gold known in commerce as "double chloride of gold and sodium" may be used in carrying out my invention.

Without confining myself to the precise mode herein described of applying the reagent,

I claim as my invention—

1. The mode or process of treating auriferous ores, the same consisting in subjecting them to a reagent, substantially as described, whereby the loss of metal during the subsequent process of obtaining the same from said ores is prevented to a greater or less extent.

2. The process of treating gold ores for the subsequent recovery of the precious metals, said process consisting in subjecting the said ores to the action of a chloride of gold, substantially as described.

In witness whereof I have hereunto set my hand.

ANSON C. TICHENOR.

Witnesses:
GEO. H. STRONG,
S. H. NOURSE.